Jan. 12, 1960 — J. ORBAN — 2,920,608
CONVERTIBLE WATER HEATING SYSTEM
Filed Aug. 4, 1953 — 6 Sheets-Sheet 5

INVENTOR
JOHN ORBAN
BY John A. Mackinney
ATTORNEY

INVENTOR.
JOHN ORBAN
BY John A. Mawhinney
ATTORNEY

United States Patent Office 2,920,608
Patented Jan. 12, 1960

2,920,608
CONVERTIBLE WATER HEATING SYSTEM
John Orban, Jackson Heights, N.Y.

Application August 4, 1953, Serial No. 372,350

12 Claims. (Cl. 122—20)

The present invention relates to improvements in a convertible water heating system and has for an object to improve the devices covered by my two U.S. Patents Nos. 2,036,602 and 2,074,989.

Another object of the present invention is to provide an improved system of this character in which the lost heat of the conventional heating system is utilized.

A further object of the present invention is to provide an improved heating system of this kind which may be selectively converted to a conventional steam boiler or a conventional hot water tank heater.

A still further object of the present invention is to provide an improved heating system having a conversion heating unit which may be quickly and easily assembled and disassembled for use or non-use when desired.

The present invention aims to provide an improved heating system into which improved automatically operated draft regulator is incorporated.

The present invention also aims to provide an improved structure of this type which will provide faster and continuous heat for large apartment and office buildings, hotels and the like, as well as for private dwelling houses.

With the foregoing and other objects in view, the invention will be hereinafter more fully described and more particularly pointed out in the appended claims.

In the drawings, in which the same parts are denoted by the same reference numerals throughout the several views.

Referring more particularly to the drawings, 10 indicates a liquid or solid fuel furnace or steam boiler of the conventional type having a steam gauge 11, a safety valve 12 for the boiler, a water gauge 13, main steam risers 14 and clean out doors 15. If the furnace 10 is of the liquid fuel type it may be equipped with oil burners 16. A smoke outlet flue 17 is connected adjacent its outer end to the boiler of the furnace 10 and at its inner end to a conversion heating unit, generally indicated at 18. The outer end of the flue 17 may be closed by a clean out cap 17a. A tap flue 19 is connected at one end to the furnace 10 and at its opposite end to the smoke flue 17 adjacent the inner end thereof. The boiler 10 may be of the three lap type and the tap flue 19 will take heat from the boiler before it makes the second lap. A slide valve 20 controls the amount of heat taken from the boiler and delivered to the conversion unit 18.

A cold water main 21 is connected at one end to a suitable source of cold water and at its opposite end it is connected to a cold water inlet fitting 22 of the conversion unit. The cold water flows from the inlet 22 through the conversion heating unit wherein it is heated and emerges as hot water from an outlet fitting 23. A hot water pipe 24 connects the outlet to a hot water conduit 25 through a T-connection 26. The conduit 25 may comprise two sections of pipe joined by a pipe connector union 27. One end of the conduit 25 is connected to the T-connection 26 and its opposite end is joined by a T-connection 28 to a pipe 29 which opens into a hot water storage tank 30. The conduit 25 is provided with a shut-off valve 31 for controlling the flow of hot water from the conversion unit to the tank 30. A safety valve 32 for the conversion unit is connected to the T-connection 26 and a safety valve 33 is provided for the tank 30. A thermostat 34 is also provided for the tank 30. A service pipe 35 is provided for conveying hot water to radiators, bath rooms and other places where hot water is desired.

The tank 30 is connected to the cold water main 21 by a water supply conduit 36 and a T-coupling 37 and the flow of cold water is controlled by a shut-off valve 38. The conduit 36 may comprise two sections of pipe joined by a pipe connector union 39. A cold water conduit 40 connects a hot water tank heater 41 to the tank 30. The conduit 40 may comprise a plurality of pipe sections joined together by the pipe connector union 42 and the T-couplings 43 and 44. The flow of water from the tank 30 to the heater 41 may be controlled by a cut-off valve 45 and a drain valve 46 may be connected to the T-coupling 44 for draining the heater 41.

A cold water circulation conduit 47 is connected at one end to the cold water conduit 40 by means of the coupling 43 at a point between the tank 30 and the valve 45 and its opposite end is connected to the cold water main 21 by a T-coupling 48. The conduit 47 may comprise a plurality of pipe sections joined by an elbow 49 and a union 50. A cut-off valve 51 is provided for controlling the flow of water through the conduit 47. A hot water conduit 52 has one end connected to the top of the heater 41 and its opposite end connected to the hot water conduit 25 by the T-connection 28. The conduit 52 may comprise two sections of pipe joined by a union 53. A cut-off valve 54 is provided for controlling the flow of hot water through the conduit 52. A valve 55 may be placed in the cold water main 21 between the T-couplings 37 and 48 for controlling the direct feed of cold water to the conversion unit 18. A drain valve 56 may be connected to the main 21 by a T-coupling for draining the water from the unit 18.

Figure 1:
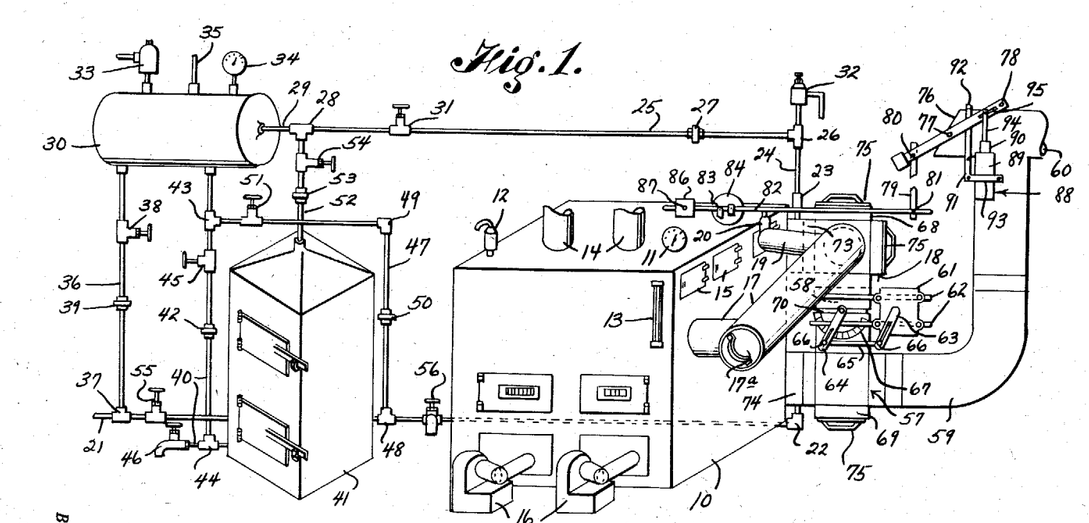
Figure 1 is a perspective view of an improved heating system constructed in accordance with the present invention and illustrating one manner of connecting the various elements.

In Figure 1 of the drawings, the conversion unit 18 is disposed at the rear of the furnace 10 in a vertical position and the smoke and heat from the furnace are delivered to a square shaped cross-connecting flue, generally indicated at 57, of the unit 18 adjacent the upper end thereof. The flow of the smoke and heat through the flue 57 may be controlled by a butterfly valve heat-control 58, which is shown in Figure 1 in dotted lines in its fully open position so that the smoke and heat may flow directly to a flue 59 and then to the main smoke outlet pipe 60. If the valve 58 is closed, the smoke and heat from the furnace 10 will flow through the entire conversion unit to the lower end portion of the flue 57 and into the flue 59 which is connected to the flue 57.

In order to operate the valve 58, a regulator electric motor 61 operated by a water tank thermostat may be mounted on the flue 57 by clamps 62 and a slotted arm 63 is connected to the shaft of the motor so as to be rotated thereby. A second slotted arm 64 is connected to the butterfly valve 58 so that the valve will be moved by the arm 64 when movement is imparted to the arm 64. A link 65 has its opposite ends pivotally joined to the arms 63 and 64 by pins 66 which ride in the slots of the arms 63 and 64. A suitably marked dial 67 may be mounted on the flue 57 to cooperate with the arm 64 to indicate the position of the valve 58.

Figures 1A, 2:
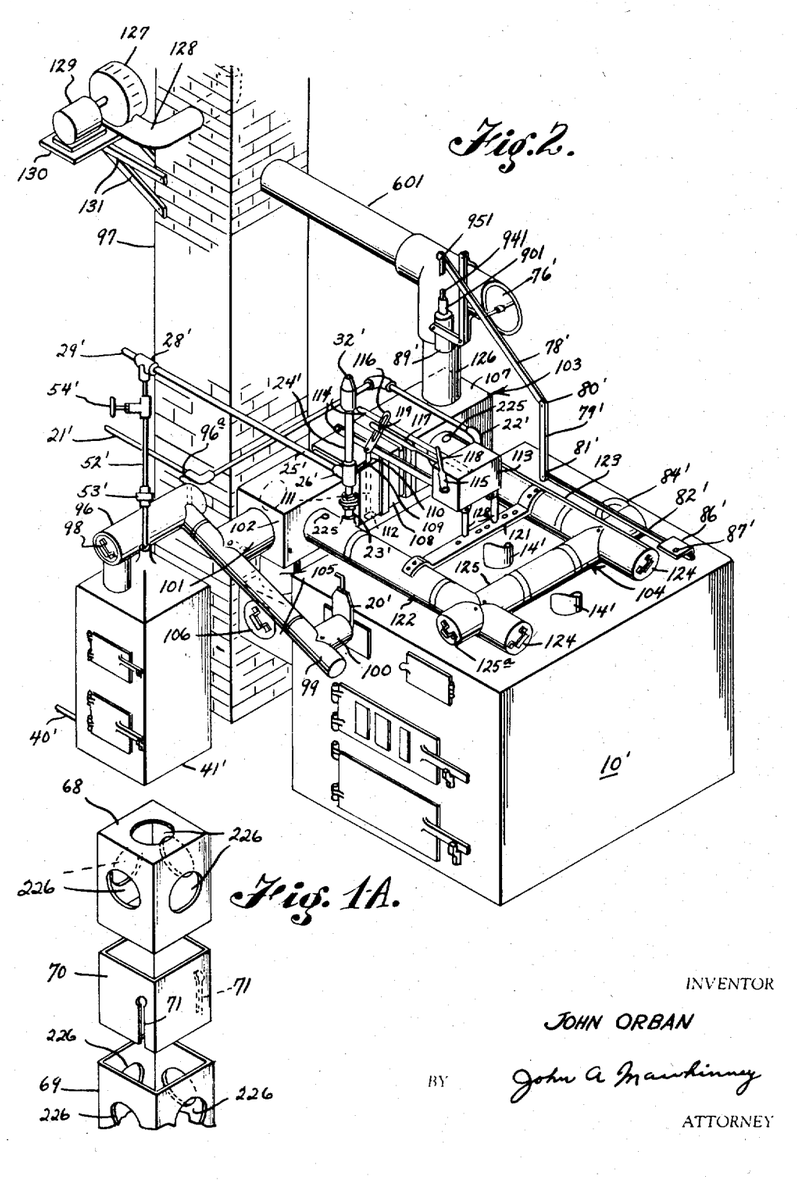
Figure 1A is an exploded view of the square cross connecting flue heat control frame.
Figure 2 is a perspective view of the device showing another manner of connecting the various elements.

As shown more particularly in Figure 1A of the drawings, the flue 57 comprises two end or corner pieces 68 and 69 and an intermediate valve supporting piece 70. The pieces 68, 69 and 70 are hollow and substantially square shape in cross section and the intermediate piece 70 is of smaller cross-sectional area than the end pieces so that it may be telescopically received by the end pieces. The piece 70 has two of its opposite sides slotted as at 71 to receive the opposite end portions of the spindle 72 of the valve 58. After the valve 58 has been mounted in the piece 70, the end pieces will be slid over the piece 70 and will retain the valve in position and the arm 64 may be secured to one of the end portions of the valve spindle which extends outwardly between the adjacent edges of the end pieces. The outer ends of the end pieces 68 and 69 may be closed by removable clean out caps 75. An indicator 58' is carried by the end piece 68 and the combined pointer and stop 58" is attached to the shaft of the butterfly valve 58 for moving over the indicator 58' for indicating the position of the valve 58. The indicator may be provided with openings for receiving a pin on the pointer so that the valve may be held in any desired position.

Figure 4:
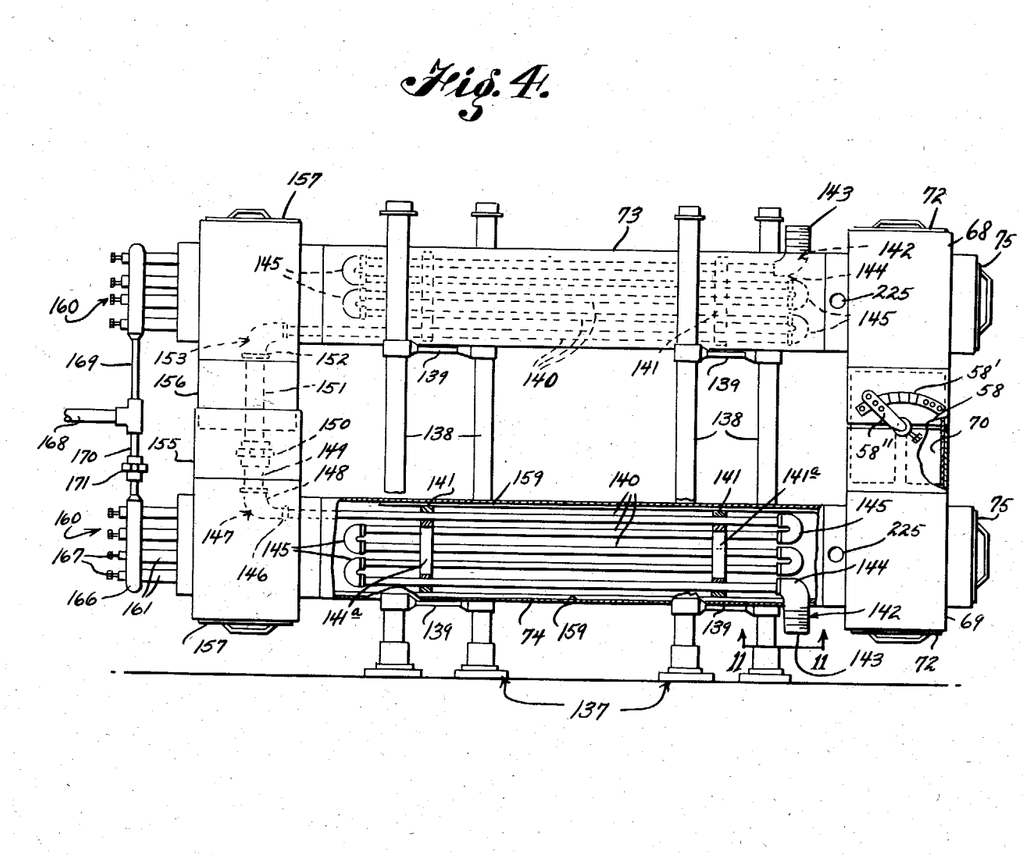
Figure 4 is a side elevational view of the conversion unit, with parts broken away.

The unit 18 also includes an inlet radiator flue 73 and an outlet radiator flue 74 which may be circular in cross section and are connected to the cross connecting flue 57 adjacent the opposite ends thereof. The outer end of the flue 73 may be closed by a clean out cap 75, and the outer end of the flue 74 communicates with the flue 59. Each of the flues 73 and 74 houses a radiator set comprising a nest of tubes which are connected with the inlet fitting 22 and the outlet fitting 23. The structure of these tubes is shown in Figure 4 of the drawings and will be described later.

In order to control the draft through the main smoke outlet pipe 60, the inner end of pipe 60 is open and the opening is controlled by a cap-type draft regulator 60a which is detachably and frictionally engaged over the open end of the pipe 60 and comprises an elongated gate 76 which is pivotally mounted as at 77 to the cap 60a. A draft regulator arm 75 is fixed intermediate its ends to the pivot 77 of the gate. A dial frame connecting rod 79 is pivotally connected as at 80 adjacent its upper end to the arm 78 adjacent the inner end thereof. The rod 79 is pivotally connected as at 81 adjacent its lower end to a dial frame lever 82 adjacent the outer end thereof. The lever 82 is pivotally connected adjacent its inner end as at 83 to a dial frame 84 which is mounted on the top of the furnace 10 with a short pipe permitting steam to enter the dial frame. Counter weights 86 are adjustably mounted on the inner free end of the lever 82 by a set screw 87 and an arm 78.

This improved cap-type draft regulator works even if the steam gauge does not show any pressure due to the fact that one-half of the gate 76 opens inwardly and the other half of the gate opens outwardly so that draft vacuum and the outside air pressure counter balance the gate. In conventional type draft regulators two to three pounds pressure is required before they can break a draft vacuum, especially if there is a good draft in the chimney. Then, if they break, they will not close this gate. If an attempt is made to regulate the conventional type of regulator with a counter-weight, then it is set too high for working pressure in the boiler.

A solenoid, generally indicated at 88, is provided for closing the gate 76, and may be electrically connected in a conventional manner to the electric motor of one of the oil burners 16. The solenoid comprises a magnetic cylinder 89 and a magnetic cylinder piston 90. The cylinder 89 is supported from the pipe 60 by a substantially L-shaped double split ring clamp 91, the ring 92 of which encircles the pipe 60 and the ring 93 of which encircles the cylinder 89. A connecting rod 94 has its lower end secured to the piston 90 and its upper end connected by a pin and slot connection 95 to the arm 78 adjacent its outer end. When the oil burners turn on the solenoid is energized and the piston is projected to close the gate 76 against the action of the counter weights 86, so that when the oil burners are running the gate remains closed and when the oil burners shut off the gate remains wide open so that the draft will not pull the heat from the boiler. Steam dial frame used on solid fuel boilers only to operate draft regulator. Magnetic solenoid used on liquid fuel boilers to operate draft regulator.

In Figure 2 of the drawings, the conversion unit is illustrated as mounted on the top of the furnace and the parts shown in Figure 2 which are similar to those shown in Figure 1 are denoted by the same reference numerals primed. A substantially L-shaped smoke pipe 96 communicates at its opposite ends with the heater 41' and a chimney 97 and may be provided with a clean out opening which is closed by a clean out cap 98. A heat flue 99 is connected at one end to the pipe 96 and adjacent its opposite end it is connected to the boiler 10' by a pipe section 100 through the opening which is controlled by the slide valve 20'. Intermediate its ends the flue 99 is connected by a pipe section 101 to an end or corner piece 102 of a square cross connecting flue, generally indicated at 103, which forms part of a conversion unit, generally indicated at 104. A smoke flue 105 may be connected to the furnace 10' and to the corner piece 102 and may be provided with a clean out cap 106.

The connecting flue 103 also includes an end or corner piece 107 and an intermediate piece 108. The pieces 102, 107 and 108 are hollow and substantially square shape in cross section and the intermediate piece is of smaller circumference than the end pieces so that it may be telescopically received by the end pieces. The intermediate piece 108 has its upper wall slotted adjacent one side thereof as indicated at 109 to receive the upper end portion of the spindle 110 of a door type valve 111. The lower wall of the piece 108 has a depression 112 formed in its inner face to receive the lower end portion of the spindle 110. After the valve 111 has been mounted in the piece 108, the end pieces will be slid over the intermediate piece and will retain the valve in upright position.

In order to operate the valve 111, a regulator magnetic solenoid or electric motor 113 may be mounted on the flue 103 by clamps 114 and an arm 115 is connected to the shaft of the motor to be driven thereby. A slotted arm 116 is connected to the upper portion of the spindle 110 for moving the valve 111. A link 117 is pivotally connected at one end to the arm 115, as indicated at 118, and has a pin and slot connection with the arm 116 at its opposite end as indicated at 119. The motor 113 may have legs 120 secured thereto which are adjustably supported by a strap 121. The strap bridges the inlet radiator flue 122 and the outlet radiator flue 123 of the conversion unit 103 and has its opposite ends secured to the flues. The flues 122 and 123 may be circular in cross section and the inlet flue 122 is connected at its inner end to the corner piece 102. The outlet flue 123 is connected at its inner end to the corner piece 107. The outer ends of the flues 122 and 123 may be closed by clean out caps 124. Adjacent their outer ends, the flues 122 and 123 are joined by a cross flue 125 which may be made up of telescopic sections to permit access to the interior thereof during assembly, the opposite ends of which may be closed by clean out plugs 125a. Each of the flues 122 and 123 houses a radiator set comprising a nest of tubes and the flue 125 houses cross connection which connect the two radiator assemblies with the cold water main 21' and the hot water conduit 25'. Such structure is illustrated in Figure 4 of the drawings and will be described later.

A flue 126 connects the corner piece 107 to the main smoke outlet pipe 60'. A booster fan 127 may be provided to increase the draft if it is necessary through the chimney with which it communicates through a duct 128. The fan may be driven by an electric motor 129, mounted on a shelf 130, supported by a bracket 131 which is secured to the chimney.

Figures 3, 16:
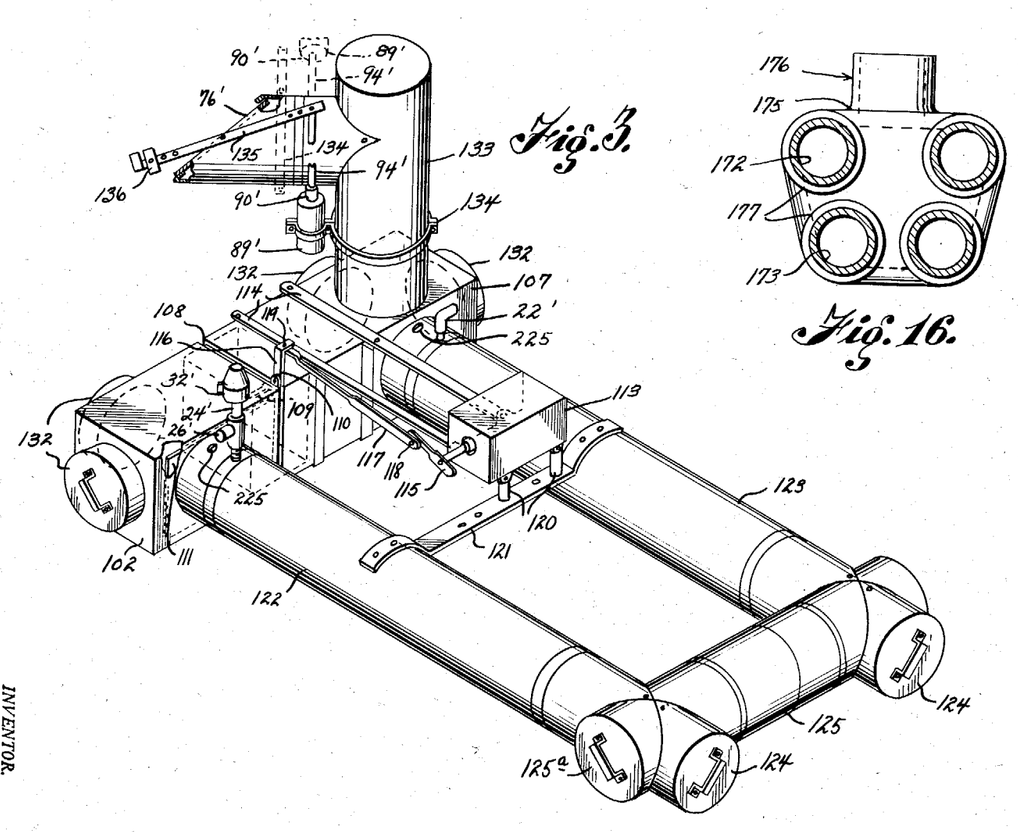
Figure 3 is a full assembly of the conversion unit perspective view of the draft regulator and the conversion unit with the heating members removed.
Figure 16 is a cross secitonal view of the double tubing showing the double tubing inlet and outlet fitting.

In Figure 3 the conversion unit 103 of Figure 2 is illustrated as removed from the furnace. The unused openings in the corner pieces 102 and 107 may be closed by clean out plugs 132. The means for opening and closing the gate 76' is different from that shown in Figure 2. The magnetic cylinder 89' is secured to the head of a T-joint 133 by a double split ring clamp 134. The connecting rod 94' is adjustably and pivotally connected to a draft regulator arm 135 adjacent one end thereof and the opposite end portion of the arm 135 adjustably carries a counter weight 136. When the solenoid 89' is in the full line upright position, the solenoid will act as a puller and when it is inverted to the dotted line inverted position it will act as a pusher.

Figure 10:
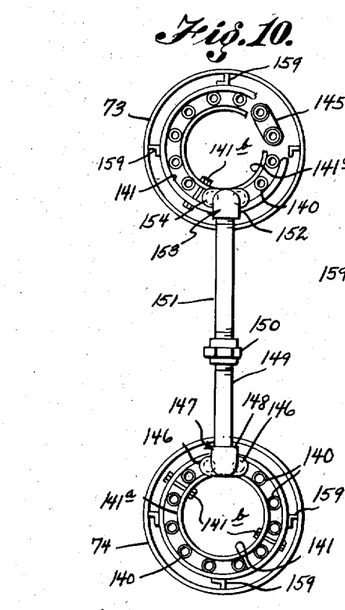
Figure 10 is an end view of the radiator sets of a single type conversion unit.
Figure 11:
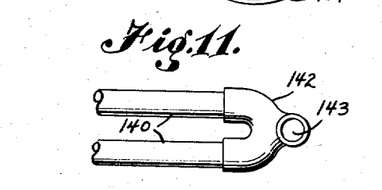
Figure 11 is a sectional view on the line 11—11 of Figure 4.
Figure 12:
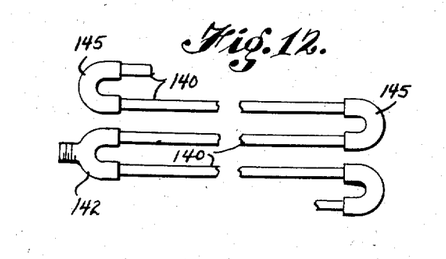
Figure 12 is a fragmentary diagrammatic view of the radiator tubing and the connecting elbows and inlet of the conversion unit.

The conversion unit may be supported in the vertical position shown in Figures 1 and 4 of the drawings by a pair of stands indicated generally at 137 in Figure 4. Each stand comprises a pair of standards 138 between which are supported a pair of cross members 139 for engaging the lower and upper radiator sets of the conversion unit. Each of the radiator sets comprises a plurality of elongated tubes 140 disposed horizontally and in pairs in circular formation, as is shown in Figure 10 of the drawings.

The tubes 140 are held in position by circular rings 141 and 141a which are held in clamping relation to the tubes by fastening means 141b. A fitting 142 has a substantially Y-shaped passageway comprising a single passageway portion 143 and two separate branch passageways 144. The fitting 142 for the lower radiator set has its single passageway portion 143 connected to the inlet 22 and its branch passageways 144 connected to the two lowermost tubes 140. The fitting 142 for the upper radiator set has its branch passageways 144 connected to the two uppermost tubes 140 and its single passageway portion connected to the outlet 23. The tubes 140 of each pair of tubes is connected to the adjacent tube of the adjacent pair of tubes by an elbow connection 145.

The uppermost tubes of the lower radiator set are connected to the two branch passageways 146 of a substantially Y-shaped passageway of a fitting 147, the single passageway portion 148 of which is connected to one end of a pipe section 149. The opposite end of the pipe section 149 is connected by a separable coupling 150 to a pipe section 151, which in turn is connected to the single passageway portion 152 of a substantially Y-shaped passageway of a fitting 153, the two branch passageways 154 of which are connected to the two lowermost tubes 140 of the upper radiator set. The fittings 147 and 153 are similar in construction to the fitting 142 shown in Figure 14 of the drawings.

A cross flue comprising two telescopic corner or end pieces 155 and 156 houses the connection 148—154 between the lower and upper radiator sets. The openings in the pieces 155 and 156 may be closed by clean out caps 157. The flues 73 and 74 extend between the corner pieces 68 and 156 and 69 and 155 and the pipes 140 are held in centered relation to the flues by four elongated supporting members 159 which may be of angle iron shape in cross section and may be disposed at about ninety degrees apart. The members 159 may be secured to the rings 141 and the flues by welding or the like.

Figure 5:
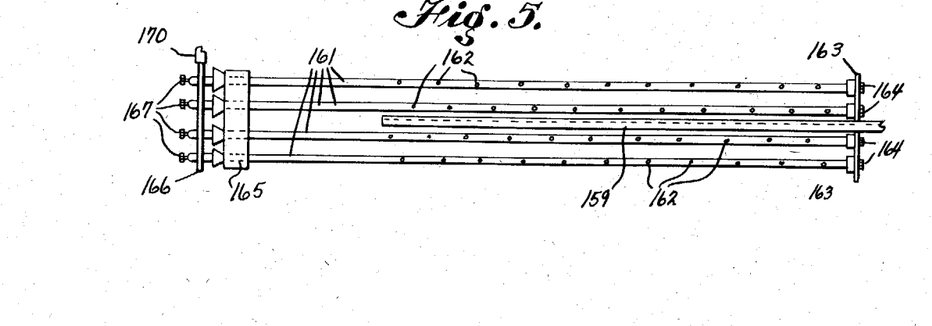
Figure 5 is a top plan view of one of the heating members.

A removable portable heating unit, generally indicated at 160, is provided for each radiator set and may comprise four gas burner tubes 161, each of which is provided with a plurality of gas jets 162. The tubes 161 of each unit are received by its flue 73 or 74 and two tubes are disposed on each side of one of the members 159 so that the tubes 161 are positioned in angular relation to one another. The tubes are held in this angular relation by arcuate shaped apertured coupling plates 63, each of which is secured to the inner closed ends of two adjacent tubes 161 by screws 164 or the like, and by disk 165. Each disk 165 has four angularly spaced apart openings through which the outer end portions of the tubes extend. A gas distributor 166 is provided for each heating unit and each tube 161 has a needle valve 167 for controlling the flow of gas from the distributor to its tube. Each gas distributor may be connected to a main gas supply pipe 168 by conduits 169 and 170. The conduit 170 may be made of two pipe sections joined by a coupling 171.

Figures 13, 14:
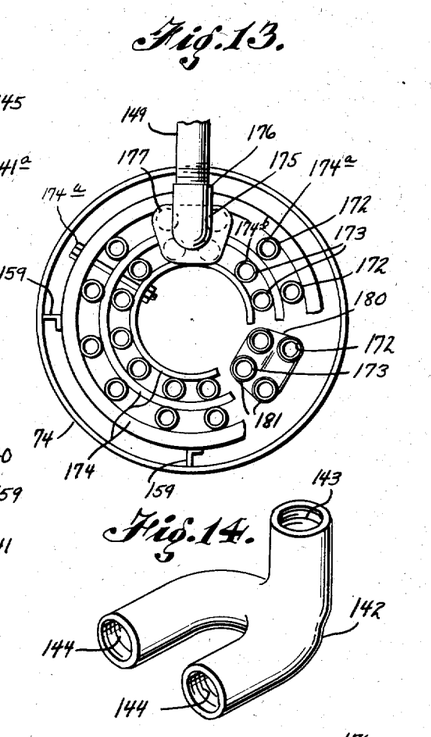
Figure 13 is an end view of the lower radiator set of a double type conversion unit.
Figure 14 is a perspective view of one of the inlet and outlet single fittings.
Figure 15:
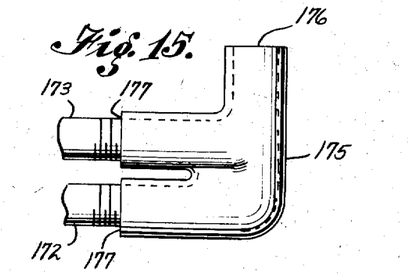
Figure 15 is a side elevational view of the inlet and outlet fitting for the double tubing conversion unit of Figure 13.

If it is desired to increase the capacity of the heating unit, two sets of tubes 172 and 173 may be provided as shown in Figure 13 of the drawings. These sets of tubes 172 and 173 may be of the same structure and arrangement as the tubes 140, except that the set of tubes 173 is disposed radially inwardly of and concentric to the set of tubes 172. The tubes 172 and 173 may be held in position by rings 174 which are held in position by bolts 174a. A fitting 175, shown in Figures 13, 15 and 16 of the drawings, has a single passageway 176 for connecting to the pipe section 149 and two U-shaped passages 177 opening into the single passageway 176 and connected to the two uppermost tubes of the two sets of tubes 172 and 173 of the lower radiator. A fitting similar to fitting 175 may be connected to the pipe section 151 and to the two lowermost tubes of the two sets of tubes 172 and 173 of the upper radiator. A fitting similar to the fitting 175 is substituted for the fitting 142 at the inlet and outlet of the lower and upper radiator tubes. A fitting 180 having two U-shaped passageways 181 therethrough, as illustrated in Figure 13 of the drawings, is provided for connecting the adjacent ends of each pair of tubes of each set of tubes 172 and 173.

In Figures 6 through 9 of the drawings there is shown a modified form of solenoid and support for operating the gate 76. The solenoid is generally indicated at 182, which may be supported from the flue 59 and the pipe 60 by a substantially L-shaped bracket, generally indicated at 183. The bracket has an arm 184 at one end of which is mounted a split clamping ring 185 for encircling and frictionally gripping the flue 59. The opposite end of the arm 184 has formed therein an elongated slot 186 so that a semi-circular clamp 187 may be adjustably mounted on the arm 184 by fastening elements 188 such as bolts and nuts for frictionally gripping the solenoid 182 between the arm 184 and the clamp 187. A second arm 189 is secured by rivets 190 or the like, to the arm 184 and its opposite end carries a split clamping ring 191 for encircling and frictionally engaging the pipe 60a.

The solenoid comprises a magnetic cylinder 192 and a piston 193 working in the cylinder and having a screw threaded piston adjusting shaft 194 which extends from one end of the cylinder. A piston shaft securing nut 195, a resilient shock washer 196 of rubber or other suitable resilient material, a washer 197 of rigid material, such as steel, an adjusting nut 198 for regulating the stroke of the piston and a jam nut 199 are received by the threaded portion of the shaft 194 of the piston. The opposite end portion of the piston is of reduced diameter, as indicated at 200, to provide an annular shoulder 201 upon which seats a resilient shock washer 202 of rubber or other suitable resilient material. A rigid washer 203 of rigid material, such as steel, may be placed upon the washer 202.

The reduced portion 200 of the piston is hollow and extends outwardly beyond the washers 202 and 203 and the extended part has a through aperture 204. A link 205 has at one end thereof an apertured portion 206 of reduced diameter which is received by the hollow portion 200 of the piston and the link may be secured to the piston by a pin 207 or the like. The opposite end of the link is bifurcated to form two spaced apart apertured ears 208 for receiving therebetween one end portion of a draft regulator arm 209. The link 205 may be adjustably secured to the arm 209 by a pin 210 which may be inserted through the apertures in the ears 208 and selectively through one of the series of openings 211 formed in the arm 209.

Figures 6, 7, 8, 9:
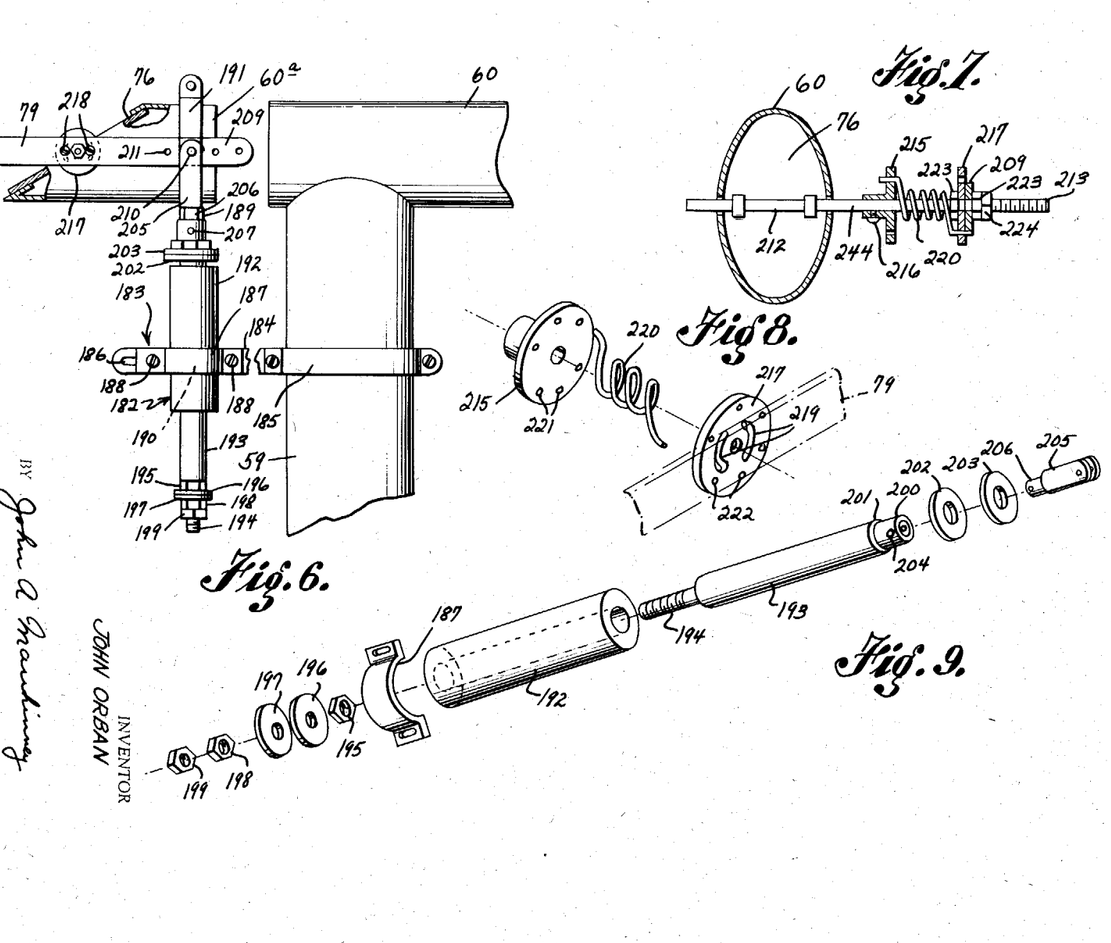
Figure 6 is an enlarged fragmentary side elevational view of the draft regulator.
Figure 7 is a sectional view of the damper and its actuating means.
Figure 8 is an exploded view of the adjusting collars and spring for the draft regulator.
Figure 9 is an exploded perspective view of the solenoid for the draft regulator.

The gate 76 has a shaft 212 which is rotatably mounted in the pipe 60 and extends laterally beyond one side of the pipe. The extended portion of the shaft 212 has a screw threaded outer end part 213 and an inner smooth faced part 214. A collar 215 is adjustably fixed by a set screw 216 to the smooth part of the shaft 212 and a collar 217 is rotatively mounted thereon. The shaft 212 extends freely through the arm 209 and is secured to the collar 217 by screws 218 or the like, which extend through arcuate slots 219 formed in the collar 217 so that the collar 217 may be angularly adjusted with respect to the collar 215 to adjust the tension of a coil spring 220. The coil spring 220 encircles the shaft part 214 between the two collars and has its opposite end portions selectively received by the angularly arranged holes 221 and 222 formed in the collars 215 and 217, respectively. Nuts 223 are received by the screw threaded portion 213 of the shaft and are positioned on each side of the collar 217 and arm 209 to hold the collar and arm against axial movement on the shaft. A jam nut 224 is provided for locking the nuts 223 in place.

In the operation of the device, it will be noted from Figures 1 and 4 of the drawings that the conversion heating unit 18 is disposed in a vertical position. Assuming that the valves 31, 55 and 56 are open, the cold water will flow from the main 21 to the inlet fitting 143 where it will be divided into two streams by the branch passageways 144, one of which will be delivered to one of the lowermost tubes 140 of the lower radiator set and the other of which will be delivered to the other lowermost tube 140. The streams of water will be conducted by separate paths up through the tubes 140 on each side of the lower radiator and through the radiator connecting pipe sections 149 and 151 in a single stream to the fitting 153 by which the single stream will again be split into two streams and travel upwardly through the tubes 140 of the upper radiator to the outlet fitting 143. The water may be heated by the heater units 160 when furnace is not operating as it flows through the tubes 140 so that it will emerge as hot water from the upper fitting 143 and flow through the hot water conduit 25 to the hot water storage tank 30 ready for use in the building in which the device is installed.

Heat from the boiler 10 may also be caused to flow through the conversion unit 18 by opening the slide valve 20 and closing the butterfly valve 58 by the operation of the motor 61. If it is not desired to utilize the heat from the boiler 10, the valve 58 may be opened so that the heat and smoke from the boiler will pass through the cross connecting flue 57 and into the flue 59 and main smoke outlet 60 and thence into the chimney 97. The control of the draft through the pipe 60 by the gate 76 has been described above.

When the system is being used in this manner, valves 38, 45, 51 and 54 should be closed. With this manner of use, hot water is supplied instantly. If the storage tank 30 becomes inoperative or is too small, the hot water conduit 25 may be disconnected from the tank and connected directly to the main feed line for hot water to the building. When it is desired to use the hot water tank heater 41, the valve 55 will be closed and the valves 31, 38, 45, 51 and 54 will be opened. The cold water will flow from the main 21 through the conduit 36 to the lower portion of the tank 30 from which it will flow in two separate streams through the conduit 40 to the heater 41 and through the conduit 47 to the main 21 and inlet 22 of the conversion unit. If it is desired to use the heater 41 alone, the valves 51 and 31 may also be closed.

In Figure 2 the conversion unit is disposed on the top of the boiler in a horizontal position and the operation is the same as that of the arrangement shown in Figures 1 and 4 of the drawings. The smoke from the boiler 10' is conveyed to the cross connecting flue 103 through the bottom of corner piece 102 and the heat from the boiler is conveyed to the flue 103 through the end of the corner piece 102.

The hot water tank heater 41' may be connected in series with the conversion unit so that if it is desired to use the heater 41' and the conversion unit in the summer without the steam boiler, the system would then operate as a circulating system. In order to accomplish this, valve 55 will be closed, the valves 31, 38, 45, 51 and 54' will be opened so that cold water will flow from the storage tank 30 to the conduit 40' and heater 41' and the heated water will flow through conduit 52' to the tank 30. Cold water will also flow to the conversion unit through the main 21'. Heat will be conveyed from the heater 41' by the flue 96 to the heat flue 99 and thence to the conversion unit when the slide valve 20' is closed, the damper 96a is closed by its handle 96b and valve 111 is closed. The tank heater 41' acts as a combustion chamber surrounded by water which is heated by the heat in the combustion chamber and the heat from this combustion chamber flows to the conversion unit to help heat the water therein so that a double benefit is derived from the heat from the heater 41'.

When no hot water storage tank 30 is used, the hot water outlet 23' from the conversion unit may be connected to the inlet of the water heating coil of the boiler 10' and the outlet of the boiler water heating coil may be connected to the hot water service line of the building. Therefore, the line from the conversion unit will supply hot water to the steam boiler, instead of cold water from the cold water feeder line. This hook-up would be used in the winter when the steam boiler is operating. In the summer time, the water heater 41' would be used, therefore, line 21' would be connected to the inlet of the water heater 41' instead of fitting 22' of the conversion unit. The water outlet from the water heater is connected at 22' of the conversion unit and line 25' from the conversion unit is connected to the building hot water supply line, and thereby making use of the conversion.

In a high pressure system, where no hot water is required, the conversion unit could be a very good money saver. In this way, the conversion unit could be built exactly the same only with heavier tubing, and without heat control 113. Set the heat control gate so that the full heat will pass through the conversion unit. It would be necessary to cut a section out of the return line, and connect that unit in a series at this point. Ftting 23' of the unit would be connected to the normal return, just low enough so that the top of the unit would be about six inches below the water level of the boiler. Fitting 22' of the unit would be connected to the other end of the original return line, which is cut. In this way, the condensation of the steam would again be brought up to the boiling point in the conversion unit, before entering the boiler. This would save between 20 to 25 percent of fuel.

When a high pressure boiler is used with this unit, it is not necessary to use the vacuum draft regulator 88' because a high pressure boiler must have a continuous heat flow to keep dry steam in the boiler. The conversion unit automatic regulator will not restrict the heat flow, regardless to which position the valve 111 is moved, because in a closed position the heat will flow through the radiator assembly of the unit. If the valve 111 is open, there will be full heat flow through the square cross connecting flue 103 and no heat flow to flue 122 as the valve 111 closes flue 122.

Prior to installing the conversion unit in a high pressure system, a draft heat temperature reading test should be taken, then take another test after installation to determine if the draft is still satisfactory for the boiler. For this purpose two openings 225 are formed in the flues of the conversion unit. If it is too low, the booster fan 127 can be operated. The fan should be adjusted to give the correct amount of draft. The fan should be installed above the smoke flue 60' and should flow upward in the chimney.

The motor 129 for the fan 127 may be connected to one of the oil burners 16 so that when the burner is operating, the fan 127 will also operate and when the burner motor cuts off, the fan will also cut off. In a coal boiler system, the booster fan would be hooked up with the dial frame 84' so that the fan would again operate automatically with the boiler pressure or a hand switch could be used to shut off the fan, especially in the summer time because there is less heat circulation.

The square flue is a great improvement because it is possible to connect the intake and exhaust flue to any of the five openings 226 at each end of this square flue.

If it should become necessary to install this unit in a place where no electricity is available, remove the safety valve 32 or 32'. Install a T-pipe fitting with a short nipple and one elbow screwed into one end of the T. The safety valve should then be reinstalled on this new elbow to bring it out to one side. A mercury dial frame is now installed at the top of the T fitting in place of the safety valve. The dial frame is then connected to the heat control regulator. Set the dial frame counterweight to obtain whatever temperature the water is desired to be. This temperature should not be more than 180 degrees F. After this adjustment, the counterweight is locked with a set screw. With a mercury dial frame it is possible to regulate the conversion unit efficiently as an alternate means to electricity.

In order to remove the portable heating units 160, the coupling 171 may be disconnected and each unit 160 slid out of its flue.

It will be noted that the hot water always travels upwardly in the tubes 140 so that there is no rumbling noise or "knocking" in the radiators as is the case in the conventional type of heating unit in which the hot water is fed downwardly.

With reference to dial frame 84 or 84', the dial frame is a part of a low pressure boiler, any low pressure type. It is used to be hooked up with the ash pit door and the blower in the ash pit for a forced draft, which is sometimes very dangerous because this blower forces the draft and the dial frame is down. The dial frame is down because there is no pressure in the boiler, especially on freshly made fire. The blower forces the air pressure which increases the oxygen in the fire box, and this makes the smoke flue and chimney a bottleneck. Then just as soon as one little fire breaks through, the freshly made coal bed causes a heavy gas explosion, especially sometimes when people do not understand firing. Sometimes the dial frame 84 or 84' is hooked up with a smoke flue damper. Again this is very dangerous and that is why many people are killed—overcome by coal gas or poisoning. That is the reason I changed this system to the cap-type draft regulator. This is important because this regulator is very sensitive because the cap-type is at a 45 degree angle and the gate is well balanced. The vacuum draft in the chimney and the outside air pressure counter-balances itself. That is what makes the gate so sensitive, and this is most valuable in a low pressure boiler because the combination of this type regulator and this type dial frame work together so perfectly that they hold the steam pressure almost at a standstill, and this sensitive cap-type regulator takes care of the fire in the boiler without anyone touching anything outside with the exception, of course, of putting coal on the fire and cleaning out ashes.

The extent of the movement of the valve 58 may be shortened or lengthened by moving the link 65 upwardly or downwardly in the slots of the arms 66. When the gate 58 begins to close the cross connecting flue, the edge of the gate guides the heat into the conversion unit.

The shut-off valve 51 is used if the heater 41 is used independently with the tank 30. This is a circulation tank. Close this valve 51 but when both units work combined, open valve 51. In case anything would go wrong with either unit you can cut one off by shutting off valve 51. Then disconnect either unit without interference with one another and the heating can continue without stopping. Cold water main 21 up in the tank, close valve 55 on drawing Figure 1. This water feeds up in the tank, and then open valve 45 and close valve 51. This water feeds into 41. If used separately, open 54. Then this water feeds into this tank 30. If used combined with conversion unit, then just open 51 and 31. Then both units work combined at the same time. If you use this conversion unit combination with the heater 41 for instant hot water or use it without the tank, the cold water is connected by the pipe 40' to tank heater 41' (see Figure 2 of the drawings). This water is discharged through this union 53'. Close valve 54', disconnect union and hook this heater outlet to the line lead into 22'. Then this water circulates through the conversion unit and out to the storage tank or into the building main hot water supply line.

Valve 46 is a drain-out valve for heater 41 and also storage tank 30. Valve 56 drains this conversion unit and the tank, but it will not drain heater 41.

Each of the corner pieces 68 and 69 has five openings 226 which is very important because when the conversion unit is installed in an existing heating plant, any one of the openings can be used at the same time as openings for the clean-out, without the trouble of removing any part of the conversion unit.

The opposite end of the round flue corner pieces are both 4-way openings so that the conversion unit can be cleaned lengthwise and crosswise without any trouble.

The heat control and frame assemblies 70, 111, 116, 119 and 110 are all in one assembly.

In Figure 3, the telescoping joint 125 is also very important because when assembling the conversion unit you connect these two units together by these joints marked 149, 150 and 151. Slide the telescoping joint together between the two 4-way corner pieces while assembling them. When the assembly is complete, pull the telescoping joint open until the end slides into the 4-way corner pieces and the Figure 3 full assembly of the conversion unit is formed.

It is obvious that various changes and modifications may be made in the details of construction and design of the above specifically described embodiment of this invention without departing from the spirit thereof, such changes and modifications being restricted only by the scope of the following claims:

What I claim is:

1. A hot water heater and fuel economizer as claimed in claim 8 further comprising a series of elongated burner tubes in one of said long flues, means for supporting said burner tubes in said one long flue comprising coupling plates secured to said burner tubes adjacent one end thereof and a disk having a series of apertures therethrough and receiving the opposite end portions of the tubes therethrough, a second series of burner tubes in said other long flue similar in construction and arrangement to said first series of burner tubes, and a detachable fuel conduit for connecting said two series of tubes together and to a source of fuel.

2. A hot water heater and fuel economizer as claimed in claim 10 further comprising means for closing the gate valve when the magnet is deenergized.

3. A hot water heater and fuel economizer as claimed in claim 2 wherein said magnet is in the form of a solenoid comprising a magnetic cylinder, a piston working in the cylinder, means for adjusting the stroke of the piston, means for absorbing the shock incident to the working of the piston, and an operative connection between said piston and the gate valve for opening the valve when the solenoid is energized and closing the valve when the solenoid is deenergized, said connection comprising a resilient element and means for adjusting the tension of said element.

4. A hot water heater and fuel economizer as claimed in claim 10 wherein said gate is elongated and pivotally supported by said cap portion at an angle of the order of forty-five degrees to the longitudinal axis of the cap portion so that substantially one half of the gate opens inwardly of said cap portion and the other half of the gate opens outwardly of the cap portion whereby the vacuum in the smoke pipe and the outside air pressure counter-balance the gate.

5. A hot water heater and fuel economizer as claimed in claim 8 wherein said cross flues and corner pieces constitute a picture frame type flue.

6. A hot water heater and fuel economizer as claimed in claim 5 wherein said corner pieces having four openings are round.

7. A conversion unit comprising a pair of vertically spaced substantially parallel shells, two series of interconnected tubes concentrically arranged in each shell and adapted to have water flow continually therethrough, each series of tubes being arranged to provide back and forth flow of water lengthwise of said shell, a conduit extending between said series of tubes, an inlet fitting for receiving the water in a single stream and having means for delivering it in four separate streams to the lowermost tubes in the lower shell of the vertical shells, fitting means for the uppermost tubes of the lower shell for converting the four streams of water into a single stream and delivering it to one end of said conduit, fitting means for conducting the single stream from the other end of the conduit and delivering it in four separate streams to the lowermost tubes in the upper shell, a cross connecting shell housing said conduit and its fitting means and communicating with said pair of shells, means for introducing smoke, gas and wasted heat from a furnace into one shell of the pair of shells so that the smoke, gas and heat flow through the shells to heat the water in the tubes and conduit, said tubes being arranged in successively elevated horizontal planes so that the hot water will travel through the tubes at all times in an upward direction, and means for delivering the four streams of hot water from the four uppermost tubes in the upper shell in a single stream.

8. A hot water heater and fuel economizer having an inlet adapted to be connected to a boiler outlet and including a heat control assembly and a smoke outlet, said heater and economizer having two long flues, a cross flue including a corner piece having five openings therein, one opening constituting said inlet, the second opening connected to the heat control assembly, the third opening connected to one of said long flues, the fourth opening for crosswise cleaning of the corner piece and the fifth opening for lengthwise cleaning of the cross flue, said cross flue also including a second corner piece having five openings therein, one opening connected to the heat control assembly, the second opening connected to the other of said long flues, the third opening connected to the smoke outlet, the fourth opening for crosswise cleaning of the second corner piece and the fifth opening for lengthwise cleaning of the cross flue, and a second cross flue including a corner piece having four openings, one opening connected to said one long flue, the second opening for crosswise cleaning of the corner piece, the third opening for lengthwise cleaning of the second cross flue, said second cross flue also including a second corner piece having four openings, one opening connected to said second long flue, the second opening for crosswise cleaning of the second corner piece, the third opening for lengthwise cleaning of the second cross flue and the fourth opening of the corner pieces of the second cross flue for interconnecting them.

9. A hot water heater and fuel economizer as claimed in claim 8 wherein the heat control assembly is positioned in the space between the two five opening corner pieces and comprises a frame having four holes one on each side and a gate acting to regulate the heat and to control the heat flow.

10. A hot water heater and fuel economizer as claimed in claim 8 further comprising an automatic draft regulator comprising an open ended cap type member having a corrugated end fitted into said smoke outlet and its opposite end having a slant cut, a gate pivotally mounted intermediate its ends on said member for swinging movement in opposite directions inwardly and outwardly of the member for opening and closing the slant cut open end of the member, and a rod connected to said gate, and means for imparting a push and pull force to said rod for opening and closing the gate including a motor and a magnet.

11. A hot water heater and fuel economizer as claimed in claim 8 in which said long flues are in the form of a heater tube frame comprising two shells and further comprising a plurality of angle iron pieces, two series of longitudinally extending concentrically arranged tubes in each shell, three annular concentrically arranged rings adjacent the opposite ends of the tubes, one of said rings being positioned between the series of tubes and the others of said three rings being disposed respectively outwardly and inwardly of the series of tubes, said pieces being secured to the inner faces of the shells and the outermost of the rings, and bolts extending through said rings between adjacent tubes to force the tubes and rings into tight frictional engagement to secure the tubes and rings together as a unit, said pieces extending inwardly a substantial distance from their points of attachment to the inner faces of the shells to their points of attachment to the outermost rings so that said units will be spaced inwardly a substantial distance from the inner faces of the shells.

12. A hot water heater and fuel economizer as claimed in claim 9 wherein means comprising a motor is provided for actuating said gate, a cross bar on said long flues for adjustably supporting the motor, and an operative connection between said motor and gate.

References Cited in the file of this patent

UNITED STATES PATENTS

| | | |
|---|---|---|
| 371,048 | Fairbanks | Oct. 4, 1887 |
| 913,489 | Glogner | Feb. 23, 1909 |
| 1,605,612 | Primrose | Nov. 2, 1926 |
| 1,845,256 | Feldmeier et al. | Feb. 16, 1932 |
| 1,987,386 | Christie | Jan. 8, 1935 |
| 2,006,726 | Walsh | July 2, 1935 |
| 2,021,009 | Ireland | Nov. 12, 1935 |
| 2,074,989 | Orban | Mar. 23, 1937 |
| 2,130,491 | Gilliland | Sept. 30, 1938 |
| 2,160,998 | Peff | June 6, 1939 |
| 2,521,462 | Kinzelmann | Sept. 5, 1950 |
| 2,521,584 | Kuehne | Sept. 5, 1950 |
| 2,537,678 | Koetting | Jan. 9, 1951 |
| 2,603,209 | Dickson et al. | July 15, 1952 |
| 2,657,473 | Montgomery et al. | Nov. 3, 1953 |
| 2,660,162 | Artis | Nov. 24, 1953 |

FOREIGN PATENTS

| | | |
|---|---|---|
| 314,637 | Great Britain | July 4, 1929 |